United States Patent [19]

Jacobs et al.

[11] 3,920,589

[45] Nov. 18, 1975

[54] LOW-DENSITY POLYESTER RESIN FOAMS AND METHOD OF PREPARATION

[75] Inventors: Richard L. Jacobs, Yorba Linda; Donald A. Backley, Garden Grove; James V. Simpson, Anaheim, all of Calif.; Walter Beck, Bedford, Mass.

[73] Assignee: Stepan Chemical Company, Northfield, Ill.

[22] Filed: July 18, 1974

[21] Appl. No.: 489,820

[52] U.S. Cl. ........ 260/2.5 N; 260/2.5 B; 260/22 CB; 260/22 XA; 260/22 CA; 260/23 P; 260/863; 260/864; 260/865; 260/866; 260/869

[51] Int. Cl.² ...................... C08J 9/00; C08L 67/06

[58] Field of Search ...................... 260/2.5 N, 2.5 B

[56] References Cited
UNITED STATES PATENTS

| | | | |
|---|---|---|---|
| 2,514,141 | 7/1950 | Phillips | 260/2.5 N |
| 3,227,665 | 1/1966 | Fourcade et al. | 260/2.5 N |
| 3,252,923 | 5/1966 | Salgado et al. | 260/2.5 N |
| 3,260,688 | 12/1966 | Watanabe et al. | 260/2.5 N |
| 3,786,004 | 1/1974 | Furuya et al. | 260/2.5 N |

*Primary Examiner*—Richard B. Turer
*Attorney, Agent, or Firm*—Richard P. Crowley

[57] ABSTRACT

Low-density polyester foams are prepared from an admixture which comprises in combination a liquid unsaturated curable polyester resin, a peroxide curing agent, an accelerator, a hydrazide blowing agent and a redox compound which adjusts the rate of polymerization of the resin, so as to expand the resin in a selective emanner to obtain a low-density, uniform, polyester foam.

26 Claims, No Drawings

LOW-DENSITY POLYESTER RESIN FOAMS AND METHOD OF PREPARATION

BACKGROUND OF THE INVENTION

Polyester foams have, in the past, been prepared by a number of techniques; however, the methods employed and the foams produced have not been wholly satisfactory or commercially successful. Various agents and methods have been used in order to extend or expand unsaturated polyester resin (for example, see U.S. Pat. Nos. 3,470,114 and 3,673,132 and French Pat. No. 2,062,608).

Polyester foams have been prepared by mechanical frothing techniques and by the use of chemical blowing agents. The use of hydrazide, hydrazo, azo and diazo-based chemical blowing agents which thermally decompose at high temperatures to provide expanded elastomers and thermoplastic polymers is well known (for example, see U.S. Pat. No. 3,461,087). The use of chemical blowing agents to date has been unsuccessful in expanding liquid polyester resins to low-desnity foams. Often the decomposition temperature of the blowing agent is either too high or too low to obtain a proper foam product.

In some compositions, the blowing agent does not function in the presence of the particular curing system usedin polymerizing the resin. For example, hydrazide blowing agents are stable and nonreactive, or react very slowly, with some peroxides at room temperatures at 80°F, and at slightly above room temperatures even in high concentrations. The addition of such chemical blowing agents to liquid unsaturated polyester resins does not cause the proper expansion of the polyester resins at room temperature upon catalysis by the peroxide alone. Further, admixtures of such blowing agents, peroxides and polyester resins do not cause expansion of the polyester resins, except upon the application of external heat. The external heat process is most difficult to control, and only a slight degree of expansion is obtained even under such conditions. Typically, the high-density foam produced exhibits severe cracking resulting from the delayed expansion of the foam resin after polymerization of the liquid resin.

A commercially available blowing agent known as OBSH-((4,4'oxybis(benezenesulfonyl hydrazide)) has been employed in peroxide catalyzed liquid unsaturated polyester resins to produce high-density polyester foams; however, such foams have not been satisfactory. OBSH normally has a decomposition temperature in air of about 150°C and in plastics of about 130° to 140°C. Commercially, OBSH is used as a blowing agent in thermoplastics, such as vinyl-chloride resins and olefinic-type resins. However, when employed in typical liquid polyester resins, a foam density of not less than about 50 pounds per cubic foot (pcf) is usually obtained which represents only a 10 to 30% expansion. The foam so obtained is often characterized by severe surface-cracking, splitting, non-uniform cells or other defects, since polymerization substantially occurs well prior to full decomposition of the OBSH blowing agent.

The decomposition temperature of OBSH has been lowered by the action of certain peroxides in particular saturated polysulfide rubbers employing OBSH: e.g., with a lead peroxide at room temperature (see, for example, U.S. Pat. Nos. 3,095,387 and 3,114,723). However, the rate of decomposition in such systems is very slow, with several hours at least required for completion of the decomposition, making such technique commercially impractical.

Some of the chemical blowing agents previously referred to become reactive with certain peroxides at low temperatures when in the presence of other chemicals known as promoters and accelerators. Admixtures of these chemicals in a liquid unsaturated polyester resin cause expansion of the polyester to provide a polyester foam. However, the foam produced is unsatisfactory and is not of low density. The expansion in such systems only partially occurs before polymerization. Since expansion continues to occur after polymerization of the liquid resin by the residual previously unreactive blowing agents, continued expansion results in diminished efficiency of the blowing agent, unacceptable cracking within the polyester foam produced and foams of high density.

In summary, although polyester foams have been produced, these foams and the techniques employed in preparing these foams have not proven commercially successful or wholly practical. A method of producing polyester foams of low density, for example, less than about 40 pounds, such as 30 pounds per cubic foot (pcf), would be most desirable. Such method and the foams produced provide a significant economic advantage in the value of the material saved by the weight reduction. In addition, the availability of acceptable low-density polyester foams permits many new applications for polyester resins, such as its use as a rigid foam structural material, and in thermal, electrical and accoustical installations, for buoyancy and in many other fields.

SUMMARY OF THE INVENTION

Our invention concerns low-density polyester resin foams, liquid polyester resin foamable compositions from which such foams are prepared, and the method of preparing such compositions and such foams.

In particular, the liquid foamable polyester resin composition from which our polyester foams are prepared comprises: a liquid unsaturated polyester resin subject to cure; e.g., either to a flexible, semirigid or rigid resin; a peroxide-curing agent which is capable of forming alkoxy radicals; an accelerator or promoted which at least partially and preferentially reacts with the peroxide-curing agent; a blowing agent which reacts to provide a hydrazine radical or ion and which liberates the gas to provide for the expansion of the liquid polyester resin; and a redox compound which permits expansion of the composition to be carried out in a selective manner prior to the curing of the resin, thereby providing for the production of a low-density polyester foam from the liquid foamable composition.

In our liquid foamable composition, each of the foregoing components must be present in combination in order to provide that the rate of polymerization of the polyester resin and the rate of decomposition of the blowing agent are selectively and properly matched. In such a composition, the liquid resin composition contains sufficient strength in the early gel stages or phases to retain the gas generated by the blowing agent. In the later stages of such composition, the rate of cure does not progress so rapidly, so as to provide a high-density mass where internal or surface cracking occurs through preliminary polymerization of the polyester resin prior to the complete or substantially complete decomposition of the blowing agent. Our invention provides a composition for and a method of so adjusting the rate of decomposition and the rate of cure to provide for a new and unique polyester foam characterized by a very low density, usually less than 30 pcf; e.g., 20 pcf, and good foam characteristics. Our foams have a lack of or a substantial reduction in internal stresses and surface cracking, and exhibit uniform cellular structure. Our method permits polyester foams often having a density as low as 10 pcf or lower to be prepared; for example, rigid and semirigid foams of from about 8 to 30 pcf.

Furthermore, our invention permits the preparation of two-component liquid systems whose components are blends which are stable for periods exceeding three months. These two-component systems are mixed in ratios varying from 1:1 to 50:1 by weight, depending upon the application properties and final physical properties desired. These components are immediately reactive even after standing for three months at temperatures no greater than 85°F to give foams which have essentially the same properties as those blends immediately prepared. The blends of the liquid polyester resin, the blowing agents, the accelerator or promoter and other redox compounds are stable, provided that the peroxide catalyst is retained in the second component. The peroxide component is prepared in a blend of hydroxyl-bearing resins and is stable indefinitely even in the presence of certain of these compounds.

The liquid unsaturated polyester resins in our composition comprise a linear or only slightly branched polyester resin and a peroxide cross-linkable monomeric compound. The linear or slightly branched polyester resin is typically prepared as a condensation or reaction product of an unsaturated polybasic and a polyhydric compound; for example, the condensation product of an unsaturated dibasic acid of alpha-beta ethylenic unsaturation and a di or trihydric compound, such as a glycol. Often a saturated polybasic acid or anhydride, such as a dibasic acid, is employed with the unsaturated acid or anhydride to modify the reactivity of the unsaturated resin.

Examples of typical polyhydric alcohols include, but are not limited to: ethylene glycol; 1,2-propane diol; 1,3-propane diol; diethylene glycol; dipropylene glycol; triethylene glycol; tripropylene glycol; 1,2-butane diol; 1,3-butane diol; 1,4-butane diol; neopentyl glycol; 2,2,5-trimethylpentane diol; cyclohexane-dimethanol; dibromoneopentyl glycol; dibromobutane diol; trimethylolpropane; pentaerythritol; trimethylpentane diol; dipropoxy adducts of bis phenol A; and dipropoxy adducts of hydrogenated bis phenol A.

Examples of saturated polybasic acids include, but are not limited to: isophthalic acid; orthophthalic acid; terephthalic acid; tetrabromophthalic acid; tetrachlorophthalic acid; tetrahydrophthalic acid; adipic acid; succinic acid; azelaic acid; glutaric acid; nadic acid and the various anhydrides obtained therefrom.

Examples of unsaturated polybasic acids include, but are not limited to: maleic acid; fumaric acid; itaconic acid; citraconic acid and anhydrides obtained therefrom.

Examples of peroxide curable cross-linking monomers employed with the linear polyesters include, but are not limited to: styrene; vinyl toluene; acrylates and methacrylates like methylmethacrylate; alphamethyl styrene; chloro styrene; and diallyl phthalate. The liquid unsaturated polyester resins also typically contain small amounts of inhibitors in order to prevent premature reaction, such as, for example: hydroquinone; quinone and tertiary butyl catechol. These monomers, the saturated acids, the unsaturated acids and the polyhydric compounds may be admixed together in various proportions as is known in the art in order to obtain resins with varying properties, typically in amounts of about 0 to 50% by weight; for example, such as 5 to 45%. Such liquid resin compositions may include a wide variety of other additives to include: viscosity index improvers; rheological agents; flame retardants; thermoplastic polymers; fillers such as hollow glass or plastic microsphere beads; wood flour; silica; diatomaceous earth; pigments; dyes; stabilizers; glass fibers; release agents; extenders; catalysts; alumina surfactants; and other additives (see, for example, compounds in "Unsaturated Polyester", Modern Plastics Encyclopedia, Volume 50, No. 10a, 1973–1974, pp. 66–68, hereby incorporated by reference).

The components of the polyester resins may be varied as is known in the art to impart the desired properties to the cured resin. Typically, flexible resins employ greater amounts of adipates or azeleates, while more rigid resins use phthalates, both with a variety of different glycols. Our invention is directed particularly to rigid and semirigid polyester foams useful as structural-type foams. Such resins have a formulation, for example, of about 3 to 7 moles of glycol, 1.5 to 3.0 moles of adipic acid, 0 to 1.5 moles of phthalic anhydride, and 2 to 4 moles of maleic anhydride, with from 1.0 to 4 moles of styrene or vinyl toluene.

However, particular emphasis is placed on formulating the resin to contain high amounts of linear dibasic glycols and linear dibasic acids; e.g., over 70%, while maintaining a low amount of aromatic dihydric acids and anhydrides, unsaturated acids, and monomers in order to impart to the resin a substantial degree of elasticity not found in typical polyester resins. Formulating for these properties becomes limited by the desired rigidity and heat resistance properties of the finished foam product. Polyester resins modified to have this elasticity and containing atypically high levels of metal; e.g., cobalt accelerators or promoters, allow expansion to proceed in a more unrestricted fashion than for highly cross-linked and more rigid polymers. Foams having densities ranging from 30 to 40 pcf, but sometimes lower than 30 pcf, are obtained characterized by having substantial cracking and splitting, because polymerization substantially occurs prior to full decomposition of the blowing agent.

The liquid unsaturated polyester resins of our composition are employed in conjunction with a free-radical curing compound or a compound capable of forming a free radical. The cross-linked initiating compound is typically a peroxide, and would include peroxides capable of forming a free radical (RO· and R'O·$^2$), particularly alkoxy-free radicals. Such peroxides are characterized by their reaction with metal salts or metal soaps which are a general class of agents known as accelerators or promoters and redox agents.

Examples of peroxides include, but are not limited to: all peroxides known as hydrogen peroxide; all hydroperoxides including saturated aliphatic hydroperoxides; olefinic hydroperoxides; aralkyl hydroperoxides; hydroperoxides of cycloaliphatic and heterocyclic organic molecules; dialkyl peroxides; transanular peroxides; peroxyesters; peroxy derivatives of aldehydes and ketones; hydroxyalkyl hydroperoxides; bis(hydroxyalkyl) peroxides; polyalkylidene peroxides; peroxy acetals, etc. The R radical of the peroxide must be a substituent usually characterized as alkyl, and must be saturated alkyl, olefinic alkyl, vinyl, allyl, benzyl, propenyl, isopropenyl, butenyl, etc., saturated or partially unsaturated aliphatic or cycloaliphatic. R' can be the same as R or it can be a hydrogen, aryl, acyl, or aroyl substituent. Examples include: methyl hydroperoxide; ethyl hydroperoxide; tbutyl hydroperoxide; dimeric benzaldehyde peroxide; dimeric benzophenone peroxide; dimeric acetone peroxide; methylethyl ketone hydroperoxide, etc.

The preferred peroxides are hydrogen peroxide or alkoxy peroxides which actuate at low temperatures less than 30°C; e.g., 20° to 25°C, with an aqueous solution of hydrogen peroxide and methylethyl ketone peroxide being the most effective peroxides. Other peroxides, such as hydroperoxides such as cumene hydroperoxide, although useful, are less effective, while peresters, such as tertiarybutylperbenzoate and tertiarybutylperoctoate, are less effective. Peracids, such as benzoylperoxide, are slightly less effective, while azobisisobutyronitrile, a free-radical generator upon thermolysis, is not effective.

The peroxide cross-linking catalyst is required in all of the liquid saturated polyester resins in order to promote the cure of the resins. The peroxide compounds may be used alone or in combination. The amount of the peroxide used will, of course, vary, depending upon the nature of the peroxide, the processing temperatures employed, the degree of curing desired, the ingredients of the liquid polyester resin and the like, all well known by people in the art, but normally ranges from about 0.1 to 2.5 parts per hundred parts of resin (phr), such as, for example, from about 0.5 to 2.0 parts.

The promoters or activators employed include a wide range of organo-metallics and particularly metal salts and soaps which have a beneficial effect in activating or promoting the reaction, and which are known and used in the trade as accelerators or promoters. Such activators are composed of metal salts and metal soaps typically in their reduced polyvalent states. These compounds are characterized by their preferential reaction with peroxide, and their partial reaction with the free radicals generated from the initial reaction with the peroxide. Typical activators include all metal soaps and salts and complexes therefrom generated by their reaction in polyester resin systems. Such activators would include salts, soaps and complexes of cobaltous, ferrous, vanadous, cadmium, manganous, cuprous, nickelous, stannous, plumbous, zirconium, chromous ions, etc. The anions of such activators may vary and are often selected to impart solubility to the activators in the polyester system. Typical anions are carboxylates such as $C_2$–$C_{18}$ carboxylates, and include short-chain acids, fatty acids and naphthenates. Such anions include acetate, propionate, butyrate, 2-ethylhexoate, hexoate, octoate, laurate, oleate, linoleate, palmitate, stearate, acetoacetonates, and naphthenates. The preferred activators are the cobalt compounds such as cobalt octoate, cobalt acetoacetonates and cobalt naphthenates. The activators may be used alone or in combination with other activators or metal salts. The activators may be employed in amounts of from about 0.001 to 0.2 phr, but more typically, are used from about 0.01 to 0.1 phr.

The chemical blowing agents employed in our compositions include hydrazide-derived and hydrazine-type blowing agents which are capable of providing on decomposition a gas, typically nitrogen, alone or in combination with other gases, to provide for the expansion of the polyester resin matrix. The chemical blowing agents useful in our compositions must be those blowing agents which are capable of being easily reacted with an ion or radical ($RO^-$, $RO^+$ or $RO\cdot$) to liberate an active moiety which will further decompose to liberate the gas.

The hydrazides and particularly the sulfonyl hydrazides are the preferred class of blowing agents to be used in our compositions. Examples of blowing agents include, but are not limited to: hydrazine, adipodihydrazide; hydroxyethylhydrazine; phenylsulfonhydrazide; 4,4-'oxybis(benzenesulfonhydrazide); hydrazine sulfate; hydrazinemonochloride; hydrazinedichloride; hydrazine bisulfate; benzene -1,3-disulfonylhydrazide; toluene-(4)-sulfonylhydrazide; diphenylsulfon-3,3'-disulfonylhydrazide, and similar hydrazide and hydrazine salts and derivatives. Preferred specific compounds, due to their commercial availability and action in our compositions, include: oxybis(benzenesulfonylhydrazide) and toluene sulfonylhydrazide. The blowing agents are typically employed in varying amounts; however, they may be employed in amounts ranging from about 0.1 to 15 phr, such as, for example, 0.3 to 10 phr. The blowing agents may be used alone or in combination.

Redox compounds are employed in our compositions to expand foams to densities substantially below 30 pcf while giving finished product foams which have essentially fine uniform cellular structure and are characterized by being free from voids, splits, cracks and other defects. The addition of these redox compounds to polyester systems containing the above-mentioned components in combination permits polyester foams to be prepared having densities as low as 10 pcf or lower.

Although not wishing to be bound by any particular theory or hypothesis, we believe that these low-density foams characterized by uniform cellularity are produced because the redox compounds specifically cause expansion to precede selectively polymerization and, specifically, gelation. Gelation is not retarded or inhibited in a fashion typical of systems containing inhibitors. Some redox agents increase the rate of gelation, but still cause expansion to precede polymerization. Other redox agents do cause the gelation period to become extended. However, these redox compounds are differentiated from typical inhibitors, such as catechols, hydroquinone and quinones in that they impart substantially greater expansion times while still allowing polymerization to proceed rapidly.

We have found that halogen-containing compounds are effective in inhibiting the polymerization rate and permitting the formation of low-density foams. In particular, we have discovered that small, but effective, amounts of halogen or halogen acids, in combination with the other components of our resin composition, permit the formation of low-density rigid and semirigid foams of good quality. For example, halogen, such as iodine, bromine, and chlorine, and halogen acids, such as hydrogen iodide, hydrogen bromide, hydrogen chloride, are effective alone or in combination. Halogen salts, such as metal salts, such as multivalent inorganic metal salts like ferric salts; e.g., chloride or alkali metal salts like sodium or potassium; e.g., iodides, chlorides, bromides, may be employed which, under conditions of the composition, generate or otherwise provide the necessary halogen or halogen acid compounds. Our redox compounds may be used alone or in combination and employed in varying amounts, such as from about 0.01 to 15 phr; e.g., 0.01 to 10 phr; e.g., 0.1 to 5.0.

Although not wishing to be bound by any particular theory or hypothesis concerning the present invention, we believe that the redox compounds prevent or retard polymerization in the peroxide-cured resin system by converting the alkoxy-free radicals to an alcohol which delays the polymerization reaction until the blowing agent is depleted, at which time, a typical polyester-free radical curing occurs.

Our redox compounds may be used alone or in combination with small amounts; e.g., 0.01 to 10 phr, of amines, such as primary, secondary and tertiary alkyl amines, primary, secondary and tertiary alkanol amines and quaternary ammonium salts, and aminophenols like triethanolamine, dimethylaminomethylphenol, 2,4,6-tri(dimethylaminomethyl)phenol, triethylenetetramine and diethanolamine, alone or in combination.

Typically, the composition after preparation is injected into a mold for the preparation of a foamed molded product. If desired, the composition, prior to use or injection, may be aerated by the mechanical whipping in of air or another inert gas. The optimum temperatures for the composition are 65° to 90°F, while the part can be cured at room temperature or cured at elevated temperatures. Typical elevated cure schedules include one hour at 200°F and one hour at 300°F. The gel times of our compositions range from as low as one second, but typically 0.1 to 15 minutes.

Our invention will be described for the purposes of illustration only with the use of semirigid and rigid polyester resin compositions to prepare low-density rigid foams.

SPECIFIC EMBODIMENTS

EXAMPLE 1.

Low-density foam resins were prepared to show that varying amounts of iodine, hydrogen iodide, potassium iodide, hydrogen chloride and ferric chloride produced foams having densities substantially less than the density of the control formula not containing these additives.

A base resin was prepared from a blend of two liquid unsaturated polyester resins, herein referred to as Resin A and Resin B.

RESIN A

| | Formula Components | Weight, grams |
|---|---|---|
| Step I | Ethylene glycol | 464.4 |
| | Propylene glycol | 570.8 |
| | Phthalic anhydride | 1315.6 |
| | Maleic anhydride | 529.2 |
| | Triphenyl phosphite | 2.8 |
| Step II | Styrene | 1121.2 |
| | Hydroquinone | 0.6 |
| | Copper (6%) naphthenate | 0.12 |
| | Total charge | 4004.72 |
| | Theoretical water loss | (256.4) |

Method of Preparation

The ingredients of Step I were weighed into a 5000 cc flask and the flask fitted with a packed column, nitrogen feed, stirrer and a thermometer. A side arm connector was attached to the packed column and a condenser was attached to the side arm connector. The mixture was gradually heated to 210° to remove water until an acid number of 30 was reached. The mixture was then cooled back to 125°C. Step II ingredients were added and thoroughly blended into the batch and cooled back to room temperature.

RESIN B

| | Formula Components | Weight, grams |
|---|---|---|
| Step I | Adipic acid | 3736. |
| | Dipropylene glycol | 10810. |
| | Theoretical water loss | (760.) |
| Step II | Maleic anhydride | 5020. |
| | Phosphoric acid (85%) | 10.0 |
| | Theoretical water loss (total) | (1564.) |
| Step III | Vinyl toluene | 3570. |
| | Hydroquinone | 0.9 |
| | Copper (6%) naphthenate | 0.54 |
| | Total resin | 20823.44 |

Method of Preparation

The step I ingredients were weighed into a 22 liter flask fitted with a packed column, nitrogen feed, stirrer and thermometer. A side arm connector was attached to the packed column and a condenser was attached to the side arm connector. The mixture was heated gradually to 210°C to remove water until an acid number of 20 was reached. The mixture was then cooled back to 70°C and the Step II ingredients were added. The heat was then increased to 210°C until an acid number of 30 was reached. The heat was cut and the temperature reduced to 125°C. Step III ingredients were added and blended thoroughly and the batch was cooled back to room temperature.

Preparation of the Control Formula

Resin A, Resin B, cobalt (12%) octoate and OBSH were blended in the following proportions and herein referred to as the Control Formula:

| Control Formula | Weight, grams |
|---|---|
| Resin A | 37.5 |
| Resin B | 12.5 |
| Base Resin | 50.0 |
| Cobalt (12%) octoate | 1.0 |
| OBSH | 2.0 |
| Total | 53.0 |

Preparation of the Foam 53.0 grams of the Control Formula were weighed into an 8 oz. paper cup and brought to a temperature of 77±1°F. 2.5 grams of Lupersol DDM* catalyst were added to the Control Formula and high-shear mixed for 10 seconds using a 2-inch diameter propeller blade drien by a ⅛ h.p. compressed-air motor rotating at approximately 3600 rpm. The bottom and sides of the cup were then scraped with a spatula to insure complete mixing, time permitting. The mixture was allowed to expand and gel in the cup and the gel time was recorded. After exotherm, the sample was post-cured for one hour at 300°F, and the final density and final hardness were determined. (The density was obtained by the water displacement method after the sample had cooled to room temperature).

*Lupersol DDM is a trademark of Pennwalt Corporation for 60% (by weight) methylethylketone peroxide.

This procedure was repeated to test the effect of adding various halogens to the Control Formula. This was accomplished by blending the stated amount of additive (Table I) into 53.0 grams of Control Formula prior to catalysis. These samples were mixed and tests were conducted in the same manner as for Control Formula. The gel times, final densities and final hardnesses are shown in Table I.

TABLE I

| No. | Additives | Added Amount, Grams | Gel Time, Minutes | Final Density, pcf. | Final Hardness, Shore D |
|---|---|---|---|---|---|
| 1 | Control Formula | — | 0.7 | 31.0 | 50 |
| 2 | *Stepan 5500 Resin | 2.5 | 0.6 | 38.2 | 56 |
| 3 | 10% (by wt.) Iodine Dispersed in 5500 Resin | 2.5 | 2.0 | 27.2 | 37 |
| 4 | "10% (by wt.) Potassium Iodide in 5500 Resin | 2.5 | 1.2 | 18.2 | 27 |
| 5 | ᵇ10% (by wt.) Ferric Chloride in 5500 Resin | 2.5 | 1.0 | 19.6 | 25 |
| 6 | Stepan 5500 Resin | 5.0 | 0.7 | 35.6 | 45 |
| 7 | 10% (by wt.) Iodine Dispersed in 5500 Resin | 5.0 | 2.7 | 21.2 | 29 |
| 8 | "10% (by wt.) Potassium Iodide in 5500 Resin | 5.0 | 1.2 | 10.4 | 6 |
| 9 | ᵇ10% (by wt.) Ferric Chloride in 5500 Resin | 5.0 | 0.7 | 11.0 | 12 |
| 10 | Stepan 5500 Resin | 7.5 | 0.7 | 40.8 | 35 |
| 11 | 10% (by wt.) Iodine Dispersed in 5500 Resin | 7.5 | 2.5 | 15.8 | 17 |
| 12 | "10% (by wt.) Potassium Iodide in 5500 Resin | 7.5 | 1.1 | 10.2 | 0 |
| 13 | ᵇ10% (by wt.) Ferric Chloride in 5500 Resin | 7.5 | Didn't gel | — | — |
| 14 | Hydrogen Iodide (50% by wt. in water) | 0.2 | 2.2 | 24.3 | 45 |
| 15 | Hydrogen Iodide (50% by wt. in water) | 0.4 | 2.6 | 18.8 | 35 |
| 16 | Hydrogen Iodide (50% by wt. in water) | 0.6 | 3.2 | 11.7 | 26 |
| 17 | Hydrogen Chloride (concentrated) | 0.25 | 1.3 | 15.0 | 56 |

"This solution was prepared by dissolving 10 parts of potassium iodide in 5 parts water and diluting with 85 parts Stepan 5500 Resin to 100 parts.
ᵇThis solution was prepared by dispersing 10 parts of ferric chloride in 10 parts of triethyl phosphate and dispersing this mixture in 90 parts of 5500 Resin.
*Stepan 5500 Resin is an unsaturated liquid polyester resin free of monomers.

EXAMPLE 2.

A polyester resin formula similar to the Control Formula of Example 1 was prepared as follows:

| Formula Components | Weight, grams |
|---|---|
| Resin A | 37.5 |
| Resin B | 12.5 |
| Total resin | 50.0 |
| Cobalt (12%) octoate | 1.0 |
| Hydrogen iodide (50% in water) | 0.4 |
| Lupersol DDM | 2.5 |

A control sample using the above formula was prepared by blending Resin A, Resin B, cobalt (12%) octoate and hydrogen iodide in a cup. Lupersol DDM was added to the mixture and the mixture was high-shear mixed for 15 seconds. The sample was allowed to gel in the cup and was then post-cured for one hour at 300°F. This control sample (not containing blowing agent) had a finished product density of 62.1 pcf.

Then 2.0 grams of various blowing agents were added to the control sample and processed in a similar manner. The gel times and final densities are reported below:

| Blowing Agent added, 4.0 grams | Gel time, minutes | Foam density |
|---|---|---|
| Control | 4.8 | 62.1 |
| Toluenesulfonylhydrazide | 0.4 | 11.5 |
| OBSH | 1.9 | 20.9 |
| Adipodihydrazide | 4.5 | 40.8 |
| Dibenzylazodicarboxylate | 6.0 | 41.4 |
| Azodicarbonamide | 4.1 | 50.0 |
| Azobis(isobutyronitrile) | 5.0 | 51.0 |

Other nonhydrazo-type blowing agents, such as dinitrosopentamethylenetetramine and oxybis(sulfonylazide) were not effective.

What we claim is:

1. An expandable liquid unsaturated polyester resin composition adapted to expand and cure, by its reaction exotherm, into a low-density polyester resin foam product, which composition comprises:

a. a liquid unsaturated polyester resin in solution with an ethylenically unsaturated monomer subject to cross-linking by catalysis with a peroxide catalyst by its own reaction exotherm on addition of the peroxide catalyst;

b. a sulfonyl hydrazide moiety present in an amount of from about 0.1 to 15 phr as a foaming agent;

c. a cobalt accelerator present in an amount sufficient to promote the cure of the polyester resin;

d. a peroxide catalyst activated at a temperature below about 100°F, which catalyst is present in an amount to provide free radicals on decomposition sufficient to cross-link the polyester resin; and e. a redox halogen-containing compound selected from the group consisting of halogens, halogen acids and halogen-containing compounds which provide the halogens or halogen acid compounds during reaction, the halogen-containing compounds present in an amount of from about 0.01 to 10 phr to permit, during the polyester resin reaction exotherm, the substantial decomposition of the foaming agent to precede selectively the exothermic gelation and curing of the polyester resin composition.

2. The composition of claim 1 wherein the polyester resin is the condensation product of adipic acid, dipropylene glycol and maleic anhydride, and the unsaturated monomer is selected from the group consisting of styrene and vinyl toluene.

3. The composition of claim 1 wherein the sulfonyl hydrazide moiety is selected from the group of compounds consisting of oxybis(benzenesulfonyl hydrazide) and toluene sulfonyl hydrazide.

4. The composition of claim 1 wherein the accelerator is an oil-soluble cobalt soap.

5. The composition of claim 1 wherein the accelerator is present in an amount of from about 0.001 to 0.2 phr.

6. The composition of claim 1 wherein the peroxide catalyst provides alkoxy-free radicals on decomposition.

7. The composition of claim 1 wherein the peroxide catalyst is present in an amount of from about 0.1 to 2.5 phr.

8. The composition of claim 1 wherein the peroxide catalyst is selected from the group consisting of methylethyl ketone peroxide and aqueous hydrogen peroxide.

9. The composition of claim 1 wherein the composition contains as a filler material hollow glass microbeads.

10. The composition of claim 1 wherein the redox halogen-containing compound is selected from the group consisting of an alkali-halide and a ferric halide.

11. The composition of claim 1 wherein the redox halogen-containing compound is selected from the group consisting of iodine, hydrogen iodide, sodium iodide, potassium iodide, hydrogen chloride and ferric chloride, and wherein the accelerator is an oil-soluble cobalt soap compound, and wherein the peroxide catalyst is selected from the group consisting of methylethyl ketone peroxide and aqueous hydrogen peroxide, and wherein the sulfonyl moiety is selected from the group consisting of oxybis(benzenesulfonyl hydrazide) and toluene sulfonyl hydrazide.

12. A method of preparing low-density polyester foams, which method comprises:
  a. admixing a liquid polyester resin composition which comprises
    i. a liquid unsaturated polyester resin in solution with an ethylenically unsaturated monomer subject to cross-linking by catalysis with a peroxide catalyst by its own reaction exotherm on addition of the peroxide catalyst.
    ii. a sulfonyl hydrazide moiety present in an amount of from about 0.1 to 15 phr as a foaming agent,
    iii. a cobalt accelerator present in an amount sufficient to promote the cure of the polyester resin,
    iv. a peroxide catalyst activated at a temperature below about 100°F, which catalyst is present in an amount to provide free radicals on decomposition sufficient to cross-link the polyester resin, and
    v. a redox halogen-containing compound selected from the group consisting of halogens, halogen acids and halogen-containing compounds which provide the halogens or halogen acid compounds during reaction, the halogen-containing compounds present in an amount of from about 0.01 to 10 phr to permit, during the polyester resin reaction exotherm, the substantial decomposition of the foaming agent to precede selectively the exothermic gelation and curing of the polyester resin composition; and
  b. expanding, by the reaction exotherm of the polyester resin composition, the polyester resin composition after admixing of the polyester resin composition components by decomposing all or substantially all of the foaming agent, such decomposition and expansion occurring prior to the gelation of the polyester resin, thereby providing a low-density polyester resin foam product.

13. The method of claim 12 which includes injecting the polyester resin composition prior to gelation and curing into a mold to provide a molded semirigid or rigid foam product.

14. The method of claim 12 which includes aerating the polyester mixture by high-shear mixing of the polyester resin composition prior to expansion of the resin.

15. The method of claim 12 wherein the expanding of the polyester resin is carried out prior to gelation at a temperature of from about 65° to 90°F.

16. The method of claim 12 which includes expanding the polyester foam to provide a cured foam product having a density of from about 5 to 40 pounds per cubic foot.

17. The method of claim 12 wherein the polyester resin is the condensation product of adipic acid, dipropylene glycol and maleic anhydride, and the unsaturated monomer is selected from the group consisting of styrene and vinyl toluene.

18. The method of claim 12 wherein the sulfonyl hydrazide moiety as selected from the group of compounds consisting of oxybis(benzenesulfonyl hydrazide) and toluene sulfonyl hydrazide.

19. The method of claim 12 wherein the accelerator is an oil-soluble cobalt soap.

20. The method of claim 12 wherein the accelerator is present in an amount of from about 0.001 to 0.2 phr.

21. The method of claim 12 wherein the peroxide catalyst provides alkoxy-free radicals on decomposition.

22. The method of claim 12 wherein the peroxide catalyst is present in an amount of from about 0.1 to 2.5 phr.

23. The method of claim 12 wherein the peroxide catalyst is selected from the group consisting of methyethyl ketone peroxide and aqueous hydrogen peroxide.

24. The method of claim 12 wherein the composition contains as a filler material hollow glass microbeads.

25. The method of claim 12 wherein the redox halogen-containing compound is selected from the group consisting of an alkali-metal halide and a ferric halide.

26. The method of claim 12 wherein the redox halogen-containing compound is selected from the group consisting of iodine, hydrogen iodide, sodium iodide, potassium iodide, hydrogen chloride and ferric chloride, and wherein the accelerator is an oil-soluble cobalt soap compound, and wherein the peroxide catalyst is selected from the group consisting of methyethyl ketone peroxide and aqueous hydrogen peroxide, and wherein the sulfonyl moiety is selected from the group consisting of oxybis(benzenesulfonyl hydrazide) and toluene sulfonyl hydrazide.

* * * * *